United States Patent
Newman et al.

(10) Patent No.: US 10,243,381 B2
(45) Date of Patent: Mar. 26, 2019

(54) ELECTROCHROMIC VEHICLE WINDOW

(71) Applicant: NIO USA, Inc., San Jose, CA (US)

(72) Inventors: Austin Newman, San Jose, CA (US); Christopher Eckert, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/364,863

(22) Filed: Nov. 30, 2016

(65) Prior Publication Data
US 2018/0037164 A1    Feb. 8, 2018

Related U.S. Application Data

(60) Provisional application No. 62/369,797, filed on Aug. 2, 2016.

(51) Int. Cl.
| | |
|---|---|
| *B60R 1/00* | (2006.01) |
| *B60R 16/033* | (2006.01) |
| *G02F 1/153* | (2006.01) |
| *G02F 1/155* | (2006.01) |
| *H02J 7/00* | (2006.01) |
| *G02F 1/163* | (2006.01) |
| *B60Q 1/26* | (2006.01) |
| *B60Q 1/50* | (2006.01) |
| *B60L 11/00* | (2006.01) |

(52) U.S. Cl.
CPC ............. *H02J 7/0047* (2013.01); *B60L 11/00* (2013.01); *B60Q 1/268* (2013.01); *B60Q 1/50* (2013.01); *G02F 1/153* (2013.01); *G02F 1/163* (2013.01)

(58) Field of Classification Search
CPC ...................................... B60J 3/02; B60J 3/04
See application file for complete search history.

(56) References Cited

U.S. PATENT DOCUMENTS

| | | | |
|---|---|---|---|
| 5,532,869 A * | 7/1996 | Goldner | G02F 1/1533 359/275 |
| 8,960,761 B2 | 2/2015 | Newman | |
| 2008/0231934 A1* | 9/2008 | Knafou | B60J 3/04 359/245 |
| 2012/0018989 A1* | 1/2012 | Breed | B60R 21/01516 280/735 |
| 2013/0158790 A1* | 6/2013 | McIntyre, Jr. | G02F 1/163 701/36 |
| 2014/0236323 A1* | 8/2014 | Brown | G02F 1/163 700/90 |
| 2015/0032328 A1* | 1/2015 | Healey | B60Q 1/503 701/36 |
| 2015/0082255 A1* | 3/2015 | DeVries | G06F 3/0488 715/863 |

* cited by examiner

*Primary Examiner* — Quan-Zhen Wang
*Assistant Examiner* — Rajsheed O Black-Childress
(74) *Attorney, Agent, or Firm* — Sheridan Ross P.C.

(57) ABSTRACT

An electrochromic vehicle window is disclosed. The electrochromic vehicle window comprises a plurality of electrochromic layers, each electrochromic layer having a different color or different visual properties. Each electrochromic layer independently oscillates between varying degrees of transparency to indicate the status of a vehicle, such as that the vehicle is charging.

20 Claims, 4 Drawing Sheets

ELECTROCHROMIC VEHICLE WINDOW

INCORPORATION BY REFERENCE

The following document is incorporated herein by reference as if fully set forth: U.S. Provisional Patent Application No. 62/369,797, filed Aug. 2, 2016.

FIELD OF INVENTION

The present invention relates to an electrochromic assembly, and more particularly relates to an electrochromic assembly for a vehicle window.

BACKGROUND

Electrochromic materials undergo a reversible change when reduction (gain of electrons) or oxidation (loss of electrons) occurs when electrode potential is applied. Most electrochromic material assemblies use a two-electrode circuit, with a solid, gel or liquid electrolyte in between a primary electrochromic electrode and a charge-balancing secondary electrode. Commercial applications of electrochromic materials include anti-glare car rear-view mirrors, electrochromic strips as battery state-of-charge indicators, and electrochromic sunglasses. One such known electrochromic application is disclosed in U.S. Pat. No. 8,960,761, which is directed to adjusting the opacity of a vehicle's window visor.

SUMMARY

In one aspect, the present application is directed to an electrochromic assembly that is integrated into a vehicle window. The electrochromic vehicle windows include a plurality of electrochromic layers, with each electrochromic layer having a different energized and non-energized state, or active and non-active state. In order to display a status, message, or indicator, one or more of the electrochromic layers oscillate between energized and non-energized states. For example, to indicate a vehicle is charging, the electrochromic layers are energized to fluctuate between 100% transparency (fully transparent) and 0% transparency over a specified time period, thus creating a fade in fade out effect. This oscillation communicates a status of the vehicle to an observer. In one embodiment, the oscillation represents the vehicle's charging heartbeat. Moreover, within the multiple electrochromic layers, smaller sections can be shaped as a symbol, logo, or text. When a vehicle does not need to display a message, the electrochromic vehicle windows are fully transparent.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

Figure 1C:
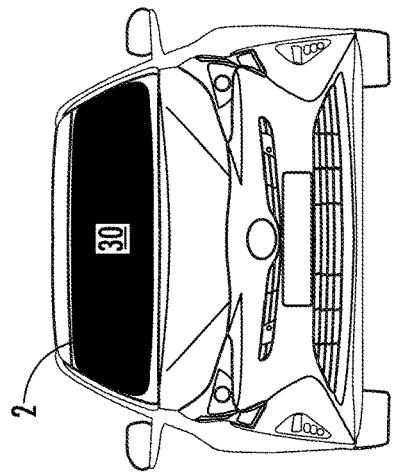
FIGS. 1A-1C illustrate a vehicle window with varying transparencies based on energized states of electrochromic layers.
Figure 1B:
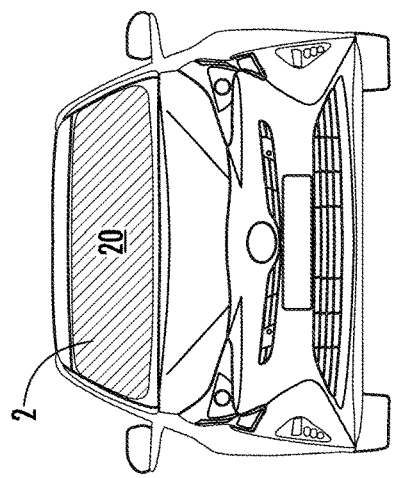
Figure 1A:
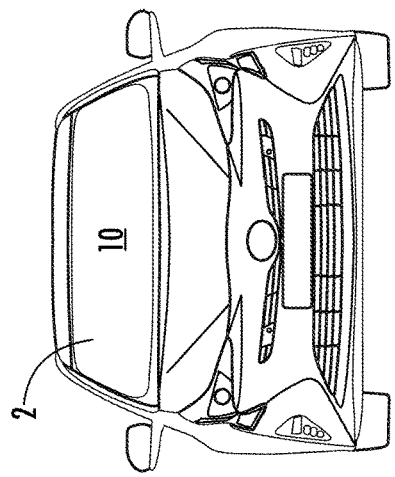

FIGS. 1A-1C illustrate embodiments of an electrochromic vehicle window 2. When the electrochromic vehicle window 2 does not need to display a status, the electrochromic vehicle window 2 is 100% transparent, as shown in window state 10 in FIG. 1A. In order to display a status, the electrochromic vehicle window 2 or a portion of the electrochromic vehicle window 2 is controlled to become less than 100% transparent, such as partially opaque as shown in window state 20 in FIG. 1B, and/or fully opaque as shown at window state 30 in FIG. 1C. Although the overall transparency is shown being adjusted in FIGS. 1A-1C, the electrochromic vehicle window can be varied to display many other features, such as a status related to a vehicle component, as discussed below.

The electrochromic vehicle window 2 includes multiple layers of electrochromic film each being a different color or having different reflective properties. Different transparencies and colors may indicate different statuses and/or may be used in combination to create different display configurations. Moreover, the different layers may be independently controlled and oscillated between varying degrees of transparency to create different display sequences. For example, one or more layers of the electrochromic vehicle window 2 may fluctuate between a fully transparent state (window state 10) and a fully opaque state (window state 30) to indicate a vehicle status.

Examples of vehicle statuses that may be displayed by the electrochromic vehicle window 2 include indicating that the vehicle is charging, the vehicle's engine is running, the vehicle is being autonomously controlled, errors are occurring with the vehicle's functioning, etc. Different display configurations (e.g., colors, sequences, transparencies, etc.) may be assigned to different statuses. Moreover, different layers may include text, pictures, logos, etc. which can also be used to convey a message (e.g., "charging," "low battery," etc.).

Figure 2:
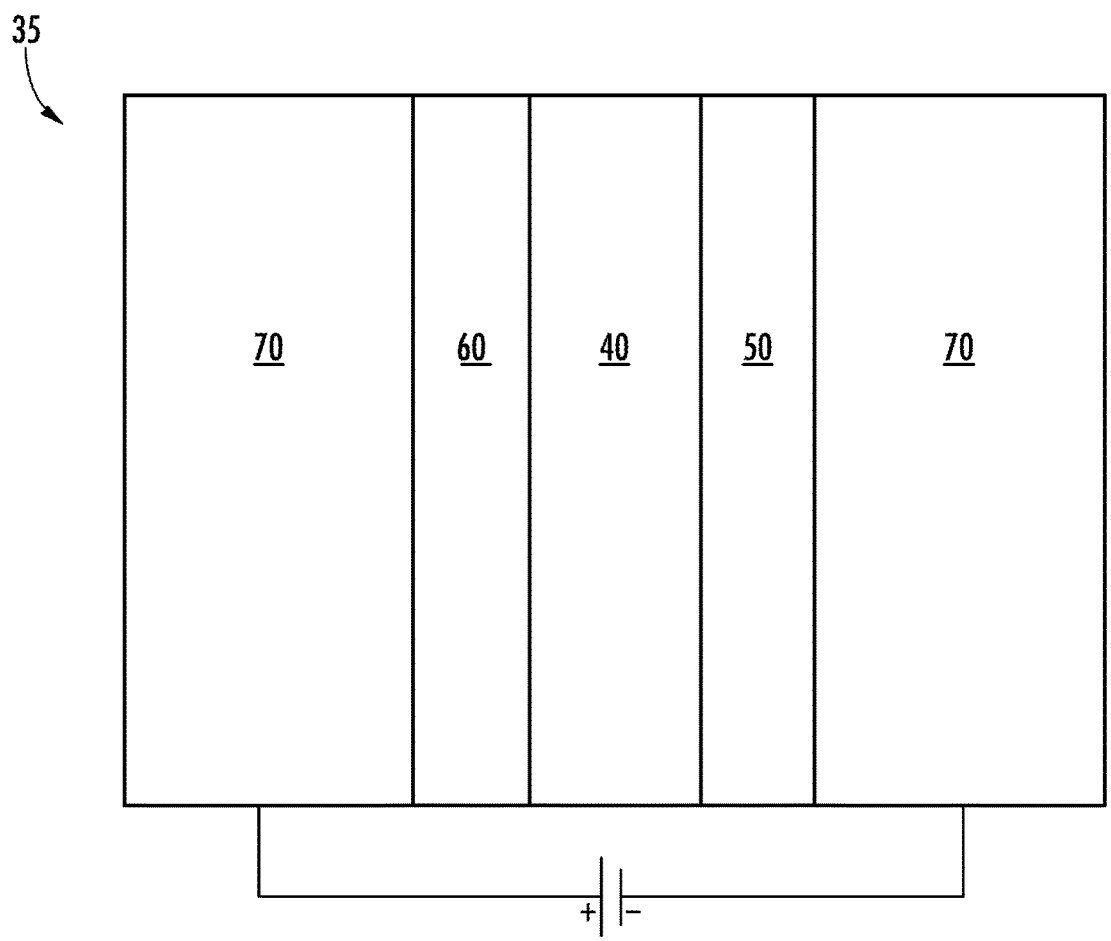
FIG. 2 illustrates layers of an electrochromic film assembly.

FIG. 2 illustrates an exemplary layer of an electrochromic film 35. As shown in FIG. 2, the electrochromic film 35 is a two-electrode circuit, with a solid, gel, or liquid electrolyte layer 40 in between a primary electrochromic electrode layer 50 and a charge-balancing secondary electrode layer 60. The three core layers are sandwiched between two transparent conductor layers 70. When electrical potential (voltage) is applied, the electrochromic film 35 changes operating states. One of ordinary skill in the art will understand from the present application that alternative embodiments and configurations of electrochromic film could be used. Essentially, the electrochromic film 35 is configured to have two different display states: (1) a first display state when the electrochromic film is non-energized or deactivated, and (2) a second display state when the electrochromic film is energized or activated. One of ordinary skill in the art will recognize from the present application that any known power source can be used to activate the electrochromic film 35.

Figure 3:
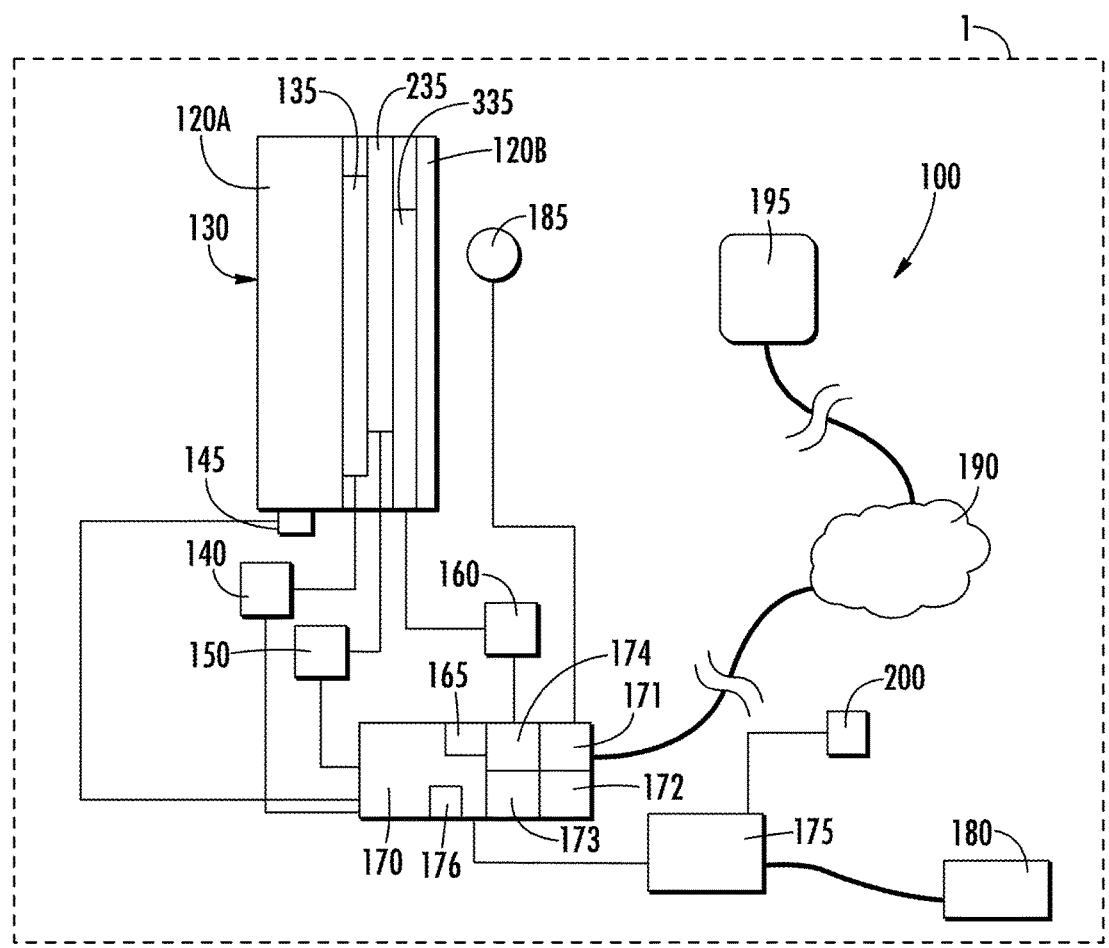
FIG. 3 illustrates an electrochromic assembly incorporated into a vehicle window.

As shown in FIG. 3, an electrochromic window assembly 100 for a vehicle 1 includes a plurality of electrochromic layers 135, 235, 335 that are combined and/or integrated with a transparent glass material layer 120a, 120b to form a vehicle window 130. Generally, the electrochromic window assembly 100 is configured to activate at least one of the electrochromic layers 135, 235, 335 in response to a vehicle condition such that at least one of the electrochromic layers 135, 235, 335 displays an indication that corresponds to the vehicle condition. The term "indication" is described further herein, but generally refers to any type of visual and representative sign, signal, symbol, warning, mark, emblem, image, or logo. The term "vehicle condition" is described further herein, but generally refers to any characteristic, feature, state, situation, circumstance, and/or phase for a vehicle. The term "vehicle condition" refers to both internal and external conditions of the vehicle.

The electrochromic layers 135, 235, 335 include similar features as described above with respect to the electrochromic film 35. Although three electrochromic layers 135, 235, 335 are illustrated in FIG. 3, one of ordinary skill in the art will recognize from the present application that any number of electrochromic layers could be provided.

The vehicle window 130 may be a front windshield, rear-window, side window, sunroof window, or mirror of a vehicle. Although two glass layers 120a, 120b are shown in FIG. 3, one of ordinary skill in the art will recognize from the present application that a single glass layer can be provided. The electrochromic layers 135, 235, 335 are incorporated into the vehicle window 130 such that when the electrochromic layers 135, 235, 335 are not energized, the vehicle window 130 is completely transparent and not visually detectable by a user.

Each of the electrochromic layers 135, 235, 335 is shaped, structured, colored, or otherwise designed to represent a different message when the layers are energized. Although each of the electrochromic layers 135, 235, 335 is distinct and unique from the other electrochromic layers, the plurality of electrochromic layers 135, 235, 335 can be complementary to each other such that energizing the electrochromic layers 135, 235, 335 in unison or at different moments creates a single coordinated image or message. The electrochromic layers 135, 235, 335 are individually energized or activated to display a feature that is different from the other layers with respect to at least one characteristic, such as color, shape, size, shade, opacity, hue, etc.

Each electrochromic layer 135, 235, 335 is connected to a switch 140, 150, 160. The switches 140, 150, 160 are individually operated to provide electrical power and/or potential to the individual electrochromic layers 135, 235, 335. The switches 140, 150, 160 are connected to an electrochromic control unit 170 that provides input signals to each of the control switches 140, 150, 160 for controlling the function of the electrochromic layers 135, 235, 335. The electrochromic control unit 170 includes a power source 165 that provides the necessary power or voltage to energize or activate the electrochromic layers 135, 235, 335. In another embodiment, the switches 140, 150, 160 are integrated with the electrochromic control unit 170. The electrochromic control unit 170 can be configured to dim or variably adjust the power or voltage provided to the electrochromic layers 135, 235, 335.

In one embodiment, the electrochromic control unit 170 includes well-known electronic control unit components, i.e. a core, memory, input device, output device, and communication links. As shown in FIG. 3, the electrochromic control unit 170 includes a processor 171, a memory 172, a storage device 173, an input 174, and an output 176. These components are only schematically illustrated in FIG. 3. The processor 171 includes a central processing unit (CPU) and a graphics processing unit (GPU) and one or more processor cores, wherein each processor core is a CPU or a GPU. The memory 172 includes a volatile or non-volatile memory, for example, random access memory (RAM), dynamic RAM, or a cache. The storage device 173 includes a fixed or removable storage, for example, a hard disk drive, a solid state drive, an optical disk, or a flash drive. It is understood that the electrochromic control unit 170 may include additional components not shown in FIG. 3.

The electrochromic control unit 170 is connected to a vehicle control unit 175. The vehicle control unit 175 serves as the central command unit for the entire vehicle and is connected to a variety of other electronics in the vehicle, such as engine monitoring systems, battery monitoring systems, tire monitoring systems, temperature control systems, GPS systems, etc., which are generically and collectively identified by reference numeral 180 in FIG. 3. The vehicle control unit 175 sub-components are not further illustrated or discussed herein, however, one of ordinary skill will recognize from the present application that the vehicle control unit 175 can include similar subcomponents as the electrochromic control unit 170. The electrochromic control unit 170 is also in communication with a wireless communication protocol 190. The wireless communication protocol 190 can include near field communication (NFC), Bluetooth, Wi-Fi, radio frequency, cloud-based communication interface, or any other communication protocol.

The wireless communication protocol 190 is connected to a user device 195, such that the user device 195 communicates with the electrochromic control unit 170. A user can control the functions of the electrochromic window assembly 100 via the user device 195. The user device 195 can include a smartphone, key fob, computer, NFC, or other communication device. A user can remotely control the functions of the electrochromic layers 135, 235, 335 via the user device 195. For example, the user can manually activate individual electrochromic layers, adjust the brightness of individual electrochromic layers, and other settings.

The electrochromic window assembly 100 includes a sensor 185. The sensor 185 is preferably located proximate to the vehicle window 130. The sensor 185 communicates with the electrochromic control unit 170 and provides input data to the electrochromic control unit 170. The sensor 185 is configured to detect stimuli, such as a physical, audible, optical or other detectable stimuli. The sensor 185 is provided to detect a vehicle condition.

In one embodiment, the sensor is configured to detect motion, e.g. a person approaching the vehicle, or approaching vehicles or objects. In one embodiment, the sensor 185 is configured to detect a charging status of the vehicle's power source, which is illustrated schematically as element 200 in communication with the vehicle control unit 175 in FIG. 3. The sensor 185 can also be configured to detect weather conditions and/or location of the vehicle. The sensor 185 can be an electromagnetic sensor, ultrasonic sensor, or any other type of sensor used in automotive applications. Although the sensor 185 is shown in communication with the electrochromic control unit 170, one of ordinary skill in the art will recognize from the present application that the sensor 185 could be directly connect to the vehicle control unit 175.

The sensor 185 sends measurement data to the electrochromic control unit 170 based on stimuli detected by the sensor 185. For example, the sensor 185 can be a position sensor. In one embodiment, the sensor 185 is a position sensor that detects an adjacent vehicle is approaching the vehicle or drifting towards the vehicle. In this embodiment, the sensor 185 sends data to the electrochromic control unit 170, and the electrochromic control unit 170 activates one of more of the plurality of electrochromic layers 135, 235, 335 to display a warning symbol, such as an exclamation point. In one embodiment, the sensor 185 is a position sensor that detects a user is approaching the vehicle, and the electrochromic control unit 170 activates one of more of the plurality of electrochromic layers 135, 235, 335 to display a welcome message or greeting. In one embodiment, the sensor 185 detects the weather via a thermometer, barometer, or other weather detection device, and the electrochromic control unit 170 activates one of more of the plurality of electrochromic layers 135, 235, 335 to display a weather icon, such as a rain cloud icon, snow flake icon, lightning bolt icon, sun icon, wind icon, or fog icon.

Other types of sensors, including a throttle position sensor, manifold pressure sensor, coolant temperature sensor, camshaft sensor, crankshaft sensor, detonation sensor, oxygen sensor, intake air temperature sensor, or any other sensor employed in combustion engines or electrical engines can be incorporated into the electrochromic window assembly 100.

As shown in FIG. 3, the electrochromic window assembly 100 includes a light module 145 adjacent to the vehicle window 130. The light module 145 is shown schematically, and can include an LED perimeter around the vehicle window 130, a projected light source directed onto the vehicle window 130, or any other type of light source. The light module 145 projects light towards the vehicle window 130 such that the images displayed by the electrochromic layers 135, 235, 335 are visible in the dark.

The schematic representation of FIG. 3 illustrates solid lines as communication connections between the components. One of ordinary skill in the art recognizes that these lines can represent wired, wireless, or any other form of communication between the components.

Figure 4A:
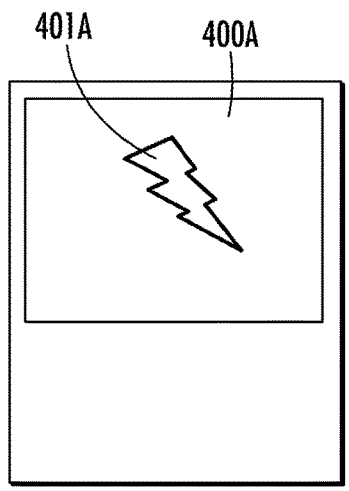
FIGS. 4A-4C illustrate electrochromic assemblies displaying a plurality of symbols.
Figure 4B:
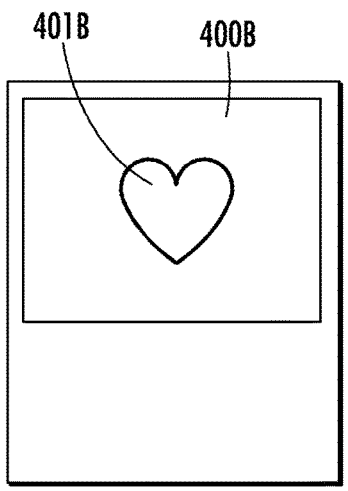
Figure 4C:
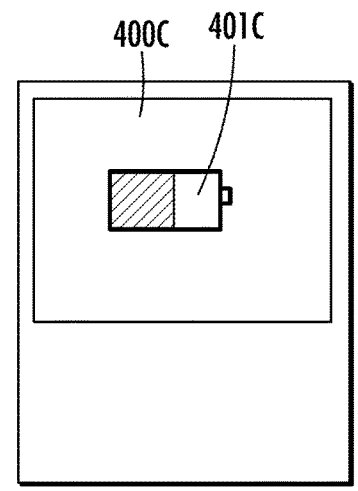

As shown in FIGS. 4A-4C, a plurality of symbols 401A, 401B, 401C are illustrated by the electrochromic layers 400A, 400B, 400C. The symbols 401A, 401B, 401C are formed by specially cut or shaped electrochromic films. The electrochromic layers 400A, 400B, 400C are controlled to illustrate a specific state of the vehicle. For example, in FIG. 4A a lightning bolt 401A is displayed to illustrate the vehicle is charging. In FIG. 4B, a heart 401B is displayed which can also correspond to a charging state of the vehicle. In FIG. 4C, a battery 401C is displayed to illustrate a charging state of the vehicle. The window illustrating the battery may comprise a plurality of electrochromic layers, which are variably energized to illustrate a variable capacity/charging level of the vehicle's battery. The battery 401C incrementally fills up as the charge of the vehicle's battery increases and incrementally is reduced as the charge of the vehicle's battery decreases.

In one embodiment, the symbol displayed by the electrochromic layers 135, 235, 335 is displayed repeatedly to simulate a heartbeat to convey that the vehicle is charging. For example, at least one of the electrochromic layers 135, 235, 335 are energized every 1-2 seconds during a charging state of the vehicle's battery until the battery is fully charged. Once fully charged, the electrochromic layers 135, 235, 335 are no longer energized and the illusion of a heartbeat ceases. The electrochromic layers 135, 235, 335 of the vehicle window 130 are preferably configured to display an image to both an interior and an exterior of the vehicle. Accordingly, the electrochromic window assembly 100 displays a vehicle's status, i.e. battery charging state, to the user prior to the user entering the vehicle. A user can therefore determine whether the vehicle is fully charged prior to entering the vehicle. Other statuses, messages, images, symbols, etc., can also be displayed by the electrochromic window assembly 100 to the user while the user is outside of the vehicle.

The electrochromic window assembly 100 can be incorporated into a self-driving vehicle and/or a ride-sharing or service vehicle. The electrochromic window assembly 100 can display whether a ride-sharing or autonomous vehicle is available to pick up a potential customer, or whether the vehicle is already occupied by a customer. For example, the electrochromic window assembly 100 can display a green symbol to indicate that the vehicle is not occupied and available to pick up a customer, and a red symbol to indicate that the vehicle is occupied and is not available to pick up a customer. The status of the vehicle can be manipulated manually by a user device, or can be automatically updated via a sensor that detects if customers are sitting in the vehicle.

Although the electrochromic window assembly 100 described above uses electrochromic film, one of ordinary skill in the art would recognize from the present application that alternative forms of smart glass or film could be adapted to a vehicle. For example, photochromic, thermochromic, suspended particle, and/or polymer dispersed liquid crystal devices can be incorporated into a vehicle window to display an image, message, or color related to a vehicle's condition.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An electrochromic assembly for a vehicle, the electrochromic assembly comprising:

a plurality of electrochromic layers integrated into a vehicle window, wherein each electrochromic layer of the plurality of electrochromic layers is configured to transition between a transparent state and an at least partially opaque state when energized, and wherein each electrochromic layer of the plurality of electrochromic layers is configured to display message information through the vehicle window when energized; and an electrochromic control unit interconnected with the plurality of electrochromic layers via respective switches, wherein the electrochromic control unit maintains the transparent state of each electrochromic layer of the plurality of electrochromic layers when a state of a vehicle system does not require messaging to be displayed by any of the plurality of electrochromic layers and transitions at least one of the plurality of electrochromic layers from the transparent state to the at least partially opaque state in response to detecting a state of the vehicle system that requires a message to be displayed by the at least one of the plurality of electrochromic layers, wherein at least a portion of the at least partially opaque state of the at least one electrochromic layer displays the message in the plurality of electrochromic layers in the vehicle window conveying information indicative of the detected state of the vehicle system through the vehicle window to an interior and an exterior of the vehicle.

2. The electrochromic assembly of claim 1, wherein the plurality of electrochromic layers include at least three electrochromic layers disposed adjacent to one another, and wherein the plurality of electrochromic layers are disposed between two glass layers.

3. The electrochromic assembly of claim 2, wherein a first electrochromic layer of the at least three electrochromic layers displays a blue color when activated by the electrochromic control unit, and a second electrochromic layer of the at least three electrochromic layers displays a symbol when activated by the electrochromic control unit, wherein the symbol is part of the message in the vehicle window conveying information indicative of the detected state of the vehicle system.

4. The electrochromic assembly of claim 1, wherein the electrochromic control unit is connected to a vehicle control unit, and wherein the electrochromic control unit is connected to a plurality of vehicle subsystems.

5. The electrochromic assembly of claim 1, wherein the electrochromic control unit is connected via a wireless communication protocol to a user device, and wherein the user device communicates via the wireless communication protocol to the electrochromic control unit and remotely control activation of the electrochromic assembly.

6. The electrochromic assembly of claim 4, wherein the vehicle control unit is in communication with a power source of the vehicle.

7. The electrochromic assembly of claim 1, further comprising a sensor configured to detect the state of the vehicle system.

8. The electrochromic assembly of claim 1, wherein the state of the vehicle system is a charging status of the vehicle's battery, wherein the message in the vehicle window conveying information indicative of the detected state of the vehicle system includes fluctuating a transparency of the plurality of electrochromic layers between a fully transparent state and an opaque state over a specified time period, the fluctuation creating a fade in fade out effect representing a beat of the charging status, and wherein the message fills an entirety of the vehicle window.

9. The electrochromic assembly of claim 1, further comprising a light module arranged adjacent to the vehicle window, wherein the light module is configured to project light toward the vehicle window and illuminate the message displayed in the plurality of electrochromic layers in the vehicle window.

10. An electrochromic assembly for a vehicle, the electrochromic assembly comprising:
a plurality of electrochromic layers integrated into a vehicle window, wherein the plurality of electrochromic layers transition between a transparent state when the plurality of electrochromic layers are not energized and an at least partially opaque state when the plurality of electrochromic layers are energized, and wherein the plurality of electrochromic layers are configured to display message information through the vehicle window when energized;
a sensor in the vehicle configured to detect a state of a vehicle system; and
an electrochromic control unit that controls an energization of the plurality of electrochromic layers, wherein the electrochromic control unit does not energize the plurality of electrochromic layers and provides the transparent state of the plurality of electrochromic layers when the detected state of the vehicle system does not require messaging to be displayed by the plurality of electrochromic layers and transitions the transparent state to an at least partially opaque state of at least one electrochromic layer of the plurality of electrochromic layers by energizing the at least one electrochromic layer when the detected state of the vehicle system requires a message to be displayed, wherein the at least partially opaque state of the at least one electrochromic layer displays the message in the plurality of electrochromic layers in the vehicle window conveying information indicative of the detected state of the vehicle system through the vehicle window to an interior and an exterior of the vehicle.

11. The electrochromic assembly of claim 10, wherein the plurality of electrochromic layers are integrally formed between glass layers of the vehicle window.

12. The electrochromic assembly of claim 10, wherein each electrochromic layer of the plurality of electrochromic layers has different shapes, sizes, or colors.

13. The electrochromic assembly of claim 10, wherein each electrochromic layer of the plurality of electrochromic layers is independently controlled by the electrochromic control unit.

14. The electrochromic assembly of claim 10, wherein each electrochromic layer of the plurality of electrochromic layers is controlled by the electrochromic control unit in response to a distinct vehicle condition to display a particular message in the vehicle window that is otherwise unable to be shown with a single electrochromic layer of the plurality of electrochromic layers.

15. The electrochromic assembly of claim 10, wherein the detected state of the vehicle system is a charging status of the vehicle's battery, wherein the message in the vehicle window conveying information indicative of the detected state of the vehicle system includes fluctuating a transparency of the plurality of electrochromic layers between a fully transparent state and an opaque state over a specified time period, the fluctuation creating a fade in fade out effect representing a beat of the charging status, and wherein the message fills an entirety of the vehicle window.

16. The electrochromic assembly of claim 10, wherein the sensor is further configured to detect a user approaching the vehicle, wherein the electrochromic control unit, in response to detecting the user approaching the vehicle, energizes the at least one electrochromic layer displaying the message in the vehicle window conveying information indicative of the detected state of the vehicle system and wherein the message is visible to the user approaching the vehicle from the exterior of the vehicle.

17. The electrochromic assembly of claim 10, wherein a first electrochromic layer of the plurality of electrochromic layers and an adjacent second electrochromic layer of the plurality of electrochromic layers are sequentially controlled by the electrochromic control unit and coordinated to display the message in the vehicle window conveying information indicative of the detected state of the vehicle system detected.

18. The electrochromic assembly of claim 10, where the at least one electrochromic layer of the plurality of electrochromic layers is periodically controlled by the electrochromic control unit to display the message in the vehicle window conveying information indicative of the detected state of the vehicle system, the periodic control oscillating the at least one electrochromic layer between varying degrees of transparency.

19. The electrochromic assembly of claim 10, wherein the detected state of the vehicle system relates to a vehicle component and the message in the vehicle window conveying information indicative of the detected state of the vehicle system is an indication including at least one of a sign, symbol, warning, emblem, image, or logo.

20. An electrochromic vehicle window assembly of a vehicle, comprising:
   an electrochromic vehicle window, comprising:
      a first glass layer;
      a first electrochromic layer arranged adjacent to and in contact with the first glass layer;
      a second electrochromic layer arranged adjacent to and in contact with the first electrochromic layer;
      a third electrochromic layer arranged adjacent to and in contact with the second electrochromic layer; and
      a second glass layer arranged adjacent to and in contact with the third electrochromic layer, wherein the first, second, and third electrochromic layers are all disposed between the first glass layer and the second glass layer forming an integrated assembly, and wherein the first, second, and third electrochromic layers are each configured to transition between a transparent state when not energized and an at least partially opaque state when energized;
   an electrochromic control unit that controls an energization of the first, second, and/or third electrochromic layers in unison or at different moments in time, wherein the electrochromic control unit does not energize the first, second, and third electrochromic layers and provides the transparent state of the electrochromic vehicle window when a state of a vehicle system does not require messaging to be displayed and transitions the transparent state to an at least partially opaque state of at least one of the first, second, and/or third electrochromic layers by energizing the at least one of the first, second, and/or third electrochromic layers when the detected state of the vehicle system requires a message to be displayed, wherein at least a portion of the at least partially opaque state of at least one of the first, second, and/or third electrochromic layers displays the message in the electrochromic vehicle window conveying information indicative of the detected state of the vehicle system through the electrochromic vehicle window to an interior and an exterior of the vehicle; and
   a sensor in communication with the electrochromic control unit and configured to detect a user approaching the vehicle, wherein the electrochromic control unit, in response to detecting the user approaching the vehicle, energizes the at least one of the first, second, and/or third electrochromic layers displaying the message in the electrochromic vehicle window conveying information indicative of the detected state of the vehicle system and wherein the message is visible to the user approaching the vehicle from the exterior of the vehicle.

* * * * *